W. WAGGONNER.
Farm-Gate.
No. 165,191. Patented July 6, 1875.
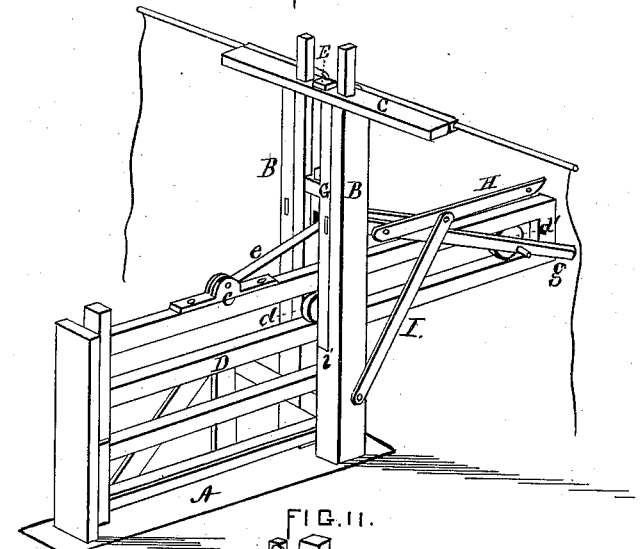
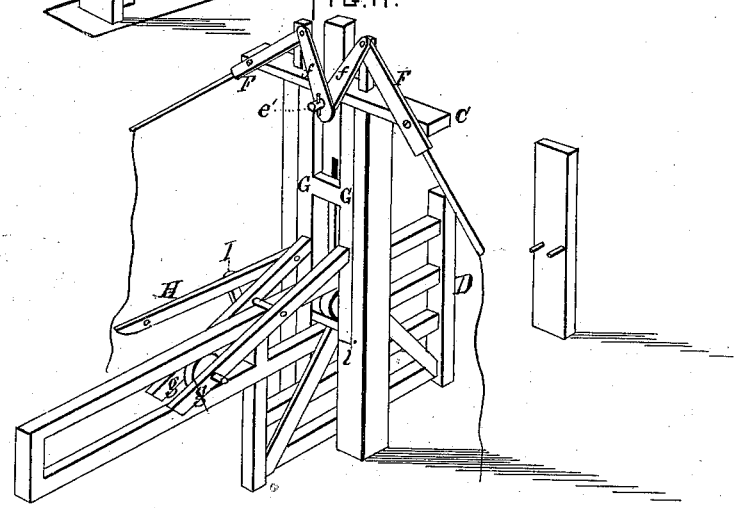
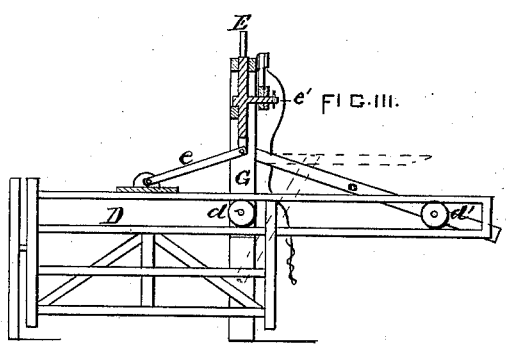
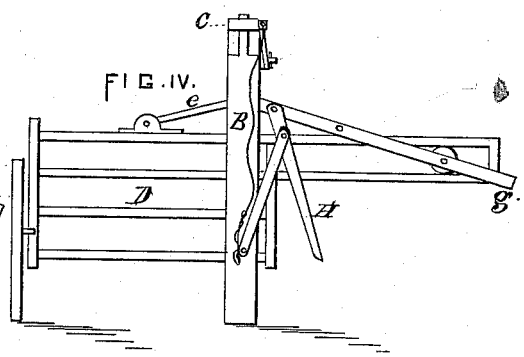
WITNESSES.
F. B. Townsend,
James Stevenson
INVENTOR.
William Waggonner
Pr. A. H. Evans & Co.
Attorneys

UNITED STATES PATENT OFFICE.

WILLIAM WAGGONNER, OF CRESTON, IOWA.

IMPROVEMENT IN FARM-GATES.

Specification forming part of Letters Patent No. 165,191, dated July 6, 1875; application filed May 1, 1875.

*To all whom it may concern:*

Be it known that I, WILLIAM WAGGONNER, of Creston, Union county, and State of Iowa, have invented a new and useful Improvement in Farm-Gates; and I hereby declare the following to be a clear, full, and exact description, reference being had to the accompanying drawings, making part of this specification, in which—

Figure 1 is a perspective view of the gate closed. Fig. 2 is a perspective view of the gate partially open. Fig. 3 is a vertical section. Fig. 4 represents the gate raised for the passage of small stock.

The object of my invention is to provide a more convenient farm-gate than those now in ordinary use, and one which may be raised in position to allow the passage of small stock beneath it; and it consists in the combination and arrangement of posts, levers, and rollers, by which it can be conveniently closed and opened to suit all the requirements of farm-gates.

In order that those skilled in the art may make and use my invention, I will proceed to describe the exact manner in which I have carried it out.

In the drawings, A represents the foundation, from the center of which rise two vertical posts or guides, B B, tied together at the top by the slatted cross-beam C. Sliding between the upright posts B B, and suspended on the friction-rollers $d$ $d'$, is the gate D. Upon the top rail of the gate is secured the slotted lug $c$, in which is pivoted one end of the pitman $e$, the other end of the pitman being secured in the slotted traveler E, which is provided with a short arm, $e'$, on which is loosely pivoted the short arms $ff$ of the jointed levers F F, these levers being pivoted on the opposite ends of the cross-beam C, as shown in Fig. 2. G G is a frame-work, sliding vertically within the posts B B, and rigidly attached at its top to the cross-beam C, and provided with the guide-arms $g$ $g$, which furnish the bearings for the friction-rollers $d'$, the friction-roller $d$ having its bearings in the frame-work G G.

The operation of my gate is as follows: A person wishing to open the gate gives a quick jerk at the rope attached to the outer end of either of the jointed levers F F, which causes the traveler E to rise vertically, and, by means of the pitman $e$, gives the gate a sudden jerk, which throws it open or shut as required. A lever, H, is attached at its short end to one of the arms $g$, and having its fulcrum on the beam I secured to the vertical post B, as shown in Figs. 1 and 2. By bearing down the lever H, the frame G carrying the gate and cross-beam C, and jointed levers F F, is raised, as shown in Fig. 4.

It is evident from this description that raising the gate to allow small stock to pass beneath does not effect the operative mechanism of the gate itself, as the whole of it is raised together by the lever H. When the gate is lowered, the frame G G rests upon the shoulders $i$ $i$ in the vertical posts B B, so as not to allow the gate to touch or come in contact with the foundation timber.

Having thus described my invention, what I claim as new, and desire to secure by Letters Patent, is—

In combination with a farm-gate, constructed as described, the frame G G, provided with the arms $g$ $g$, and the lever H for raising the gate, substantially as and for the purpose set forth.

WILLIAM WAGGONNER.

Witnesses:
JAMES M. McDILL,
L. S. GRAVES.